(12) United States Patent
Johnson

(10) Patent No.: US 6,681,116 B1
(45) Date of Patent: Jan. 20, 2004

(54) COMMUNICATION SYSTEM

(75) Inventor: Harold W. Johnson, Roach, MO (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/304,185

(22) Filed: May 3, 1999

(51) Int. Cl.[7] ............................................... H04M 1/00
(52) U.S. Cl. ........................ 455/552.1; 455/553.1; 455/41.1; 455/41.2; 455/448; 455/449; 379/56.3
(58) Field of Search .................. 379/338, 56.2, 379/56.3; 370/352, 338, 310, 331, 386, 905; 455/449, 422, 444, 448, 41.1, 41.2, 552.1, 553.1, 150.1, 151.2

(56) References Cited

U.S. PATENT DOCUMENTS

| | | | | |
|---|---|---|---|---|
| 5,475,735 A | * | 12/1995 | Williams et al. | 455/403 |
| 5,737,690 A | * | 4/1998 | Gutman | 340/7.54 |
| 5,802,467 A | * | 9/1998 | Salazar et al. | 455/420 |
| 6,049,593 A | * | 4/2000 | Acampora | 379/56.2 |
| 6,122,508 A | * | 9/2000 | Veloso | 455/433 |
| 6,219,555 B1 | * | 4/2001 | Larsson | 455/456.2 |
| 6,323,980 B1 | * | 11/2001 | Bloom | 398/129 |
| 6,407,779 B1 | * | 6/2002 | Herz | 348/734 |

* cited by examiner

Primary Examiner—Lee Nguyen
Assistant Examiner—Tuan Tran

(57) ABSTRACT

A communication system comprising a first communication node connected to a second communication node by a wireline for integrating parallel layers of wireless communications for exchange with users. The first communication node comprising a free-space laser device, a first wireless system, and a first wireline device, and a second communication node comprising a second wireless system and a second wireline device.

28 Claims, 4 Drawing Sheets

COMMUNICATION SYSTEM

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention relates to a communication system, and specifically, to a communication system integrating a plurality of wireless systems including a free-space laser system for exchanging parallel layers of wireless communications with users.

2. Description of the Prior Art

The number of organizations with high volumes of communications between locations is growing exponentially due to applications such as Internet access, file sharing, email, and video conferencing. In today's communications environment, users subscribe to several services offered by different communications providers, each with their respective wireline communication links and/or wireless communication links.

A wireline communication link is comprised of physically tangible connection between wireline devices. Examples of wireline links include copper, aluminum, and fiber optic cabling carrying protocols such as Synchronous Optical Network (SONET), Asynchronous Transfer Mode (ATM), Transmission Control Protocol/Internet Protocol (TCP/IP), Ethernet, T1, DS3, and dense wave division multiplex fiber optic lines.

Wireless communication links propagate electromagnetic radiation over an air interface between wireless devices. Wireless links provide broadband, narrow band, fixed and portable wireless services. Examples of wireless links include personal communications service (PCS) links, millimeter wave links, code division multiple access (CDMA) links, time division multiple access (TDMA) links, spread spectrum links, microwave links, and free-space laser communication links.

Free-space lasers propagate free-space laser light over an air interface between free-space laser devices. Free-space lasers provide large bandwidths of communications within a targeted coverage area. Additionally, free-space lasers have been successfully deployed in outer space for inter-satellite communications. As a result, free-space laser circuitry is now commercially viable for ground-to-ground terrestrial communications. Unfortunately, the various wireline links, the various wireless links, and free-space laser links have not been integrated into a single communication system.

SUMMARY OF THE INVENTION

The present invention advances the art by providing a communication system that integrates multiple layers of wireless systems including a free-space laser device to provide communications to fixed, portable and mobile customer sites. Advantageously, the present communication system integrates a plurality of radio frequency wireless devices and free-space laser devices into an efficient homogeneous architectural integration having multiple layers of wireless communications. Some examples of wireless access services provided include but are not limited to broadband, narrow band, fixed, mobile and portable services. The present communication system increases efficiency and leverages combined use of network assets by managing high volumes of communications over the most appropriate layer based on invoked customer service demand, cost and criticality of the traffic. Advantageously, downtime of mission critical traffic is minimized while cost efficiency and throughput performances are maximized. Additionally, the wireless layers are configured into a cell structure with each cell containing layers topologically designed with systems appropriate for different geographic and demographic service objectives and includes a wireless system for the interconnection of the cell cites within the cell structure. Services provided by the present communication system include but are not limited to, voice telephony, data services, video, email services, messaging, Intranet/Entranets/Extranets, content and information services, multimedia, video, email and electronic commerce.

The communication system comprises a first communication node, connected to a second communication node by a wireline. The first communication node comprises a free-space laser device, a first wireless system, and a first wireline device. The free space laser device is configured to receive and transmit free-space laser signals, to receive and transmit first inter-node signals, and to convert between the free-space laser signals and the first inter-node signals. The first wireless system is configured to receive and transmit first wireless signals, to receive and transmit second inter-node signals, and to convert between the first wireless signals and the second inter-node signals. The first wireline device is configured to exchange the first inter-node signals with the free-space laser device, to exchange the second inter-node signals with the first wireless system, to convert between the first inter-node signals and first wireline signals, to convert between the second inter-node signals and the first wireline signals, and to exchange the first wireline signals with a wireline.

The second communication node comprises a second wireless system and a second wireline device. The second wireless system is configured to receive and transmit second wireless signals, to receive and transmit third inter-node signals, and to convert between the second wireless signals and the third inter-node signals. The wireline device is configured to exchange the third inter-node signals with the second wireless system, to convert between the third inter-node signals and second wireline signals, and to exchange the second wireline signals with the wireline.

DETAILED DESCRIPTION OF THE PREFERRED EMBODIMENT

Figure 1:
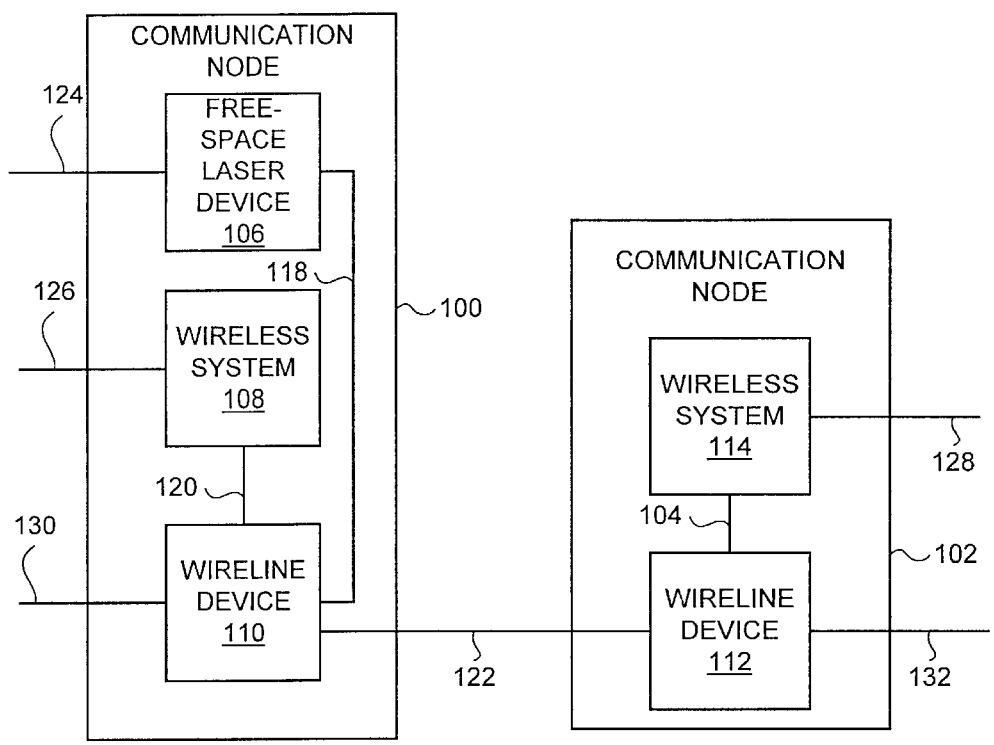
FIG. 1, illustrates a system configuration for the communication system in an example of the invention.

FIG. 1 depicts a first communication node 100, and a second communication node 102. First communication node 100 comprises free-space laser device 106, first wireless system 108, first wireline device 110, first inter-node link 118, and second inter-node link 120. Second communication node 102 comprises a second wireline device 112, a second wireless system 114, and third inter-node link 104. First communication node 100, and in particular free-space laser device 106 and wireless system 108 are configured for mounting on an elevated structure. Some examples of elevated structures include but are not limited to, towers, building roofs and through window transmission of elevated building windows. Alternatively, one skilled in the art will understand that nodal antennas and free-space-laser device 106 could be mounted on an elevated structure while the various wireless devices comprising wireless system 108 and first communication node 100 could be located on the ground.

First communication node 100 and second communication node 102 are connected by a wireline 122. Wireline 122 is a physically tangible connection for the exchange of first wireline signals and second wireline signals between first wireline device 110 and second wireline device 112. Wireline device 110 and wireline device 112 also include wirelines 130 and 132 respectively. Wirelines 130 and 132 are physically tangible connections that could connect to other network elements or to customer sites depending on system configuration. One skilled in the art will appreciate that additional wirelines could be present as a matter of design choice although only wirelines 130 and 132 are shown for clarity. Some examples of wirelines 122, 130 and 132 include but are not limited to, copper, aluminum, and fiber optic cabling carrying protocols such as SONET, ATM, TCP/IP, Ethernet, T1, and DS3.

Free-space laser device 106 and first wireline device 110 are linked by first inter-node link 118. First wireless system 108 and first wireline device 110 are linked by second inter-node link 120, and second wireless system 114 and second wireline device 112 are linked by third inter-node link 104. First inter-node link 118 could be any connection capable of exchanging first inter-node signals between first wireline device 110 and free-space laser device 106. Second inter-node link 120 could be any connection capable of exchanging second inter-node signals between first wireline device 110 and first wireless system 108. Third inter-node link 104 could be any connection capable of exchanging third inter-node signals between second wireline device 112 and second wireless system 114. Some examples of inter-node links 118, 120, and 104 could be conventional links such as a physically tangible wireline or a wireless link.

First wireline device 110 could be any device configured to exchange first inter-node signals with free-space laser device 106, exchange second inter-node signals with first wireless system 108, and exchange first wireline signals over wireline 122 and/or wireline 130. Second wireline device 112 could be any device configured to exchange third inter-node signals with second wireless system 114 and exchange second wireline signals over wireline 122 and/or wireline 132. One example of first wireline device 110 and second wireline device 112 is a fiber optic dense wave division multiplexed (DWDM) device.

Free-space laser device 106 could be any device operable to receive and transmit free-space laser signals 124 over a free-space laser communications path, receive and transmit first inter-node signals over first inter-node link 118, and convert between free-space laser signals 124 and the first inter-node signals. A free-space laser communications path comprises the propagation of light waves over an air interface between free-space laser device 106 and a second free-space laser device at another site. In the context of the invention, the term "free-space laser" does not include the transmission and detection of light waves over fiber optic or other physically tangible connections.

First wireless system 108 could be any system configured to receive and transmit first wireless signals 126 over a first wireless communications path, receive and transmit second inter-node signals over second inter-node link 120, and convert between the second inter-node signals and first wireless signals 126. The first wireless communications path comprises the propagation of electromagnetic radiation over an air interface between first wireless system 108 and a second wireless system at another site. Second wireless system 114 could be any system configured to receive and transmit second wireless signals 128 over a second wireless communications path, receive and transmit third inter-node signals over third inter-node link 104, and convert between the third inter-node signals and second wireless signals 128. The second wireless communications path comprises the propagation of electromagnetic radiation over an air interface between second wireless system 114 and a second wireless system at another site. Some examples of wireless signals 126 and 128, include but are not limited to, analog and digital cellular signals, PCS signals, satellite communications signals, and broadband microwave and millimeter wave signals carrying protocols such as CDMA, TDMA, web based code division multiple access (WBCDMA), time division multiplexed (TDM) signals, and spread spectrum frequency hopper signals.

Figure 2:
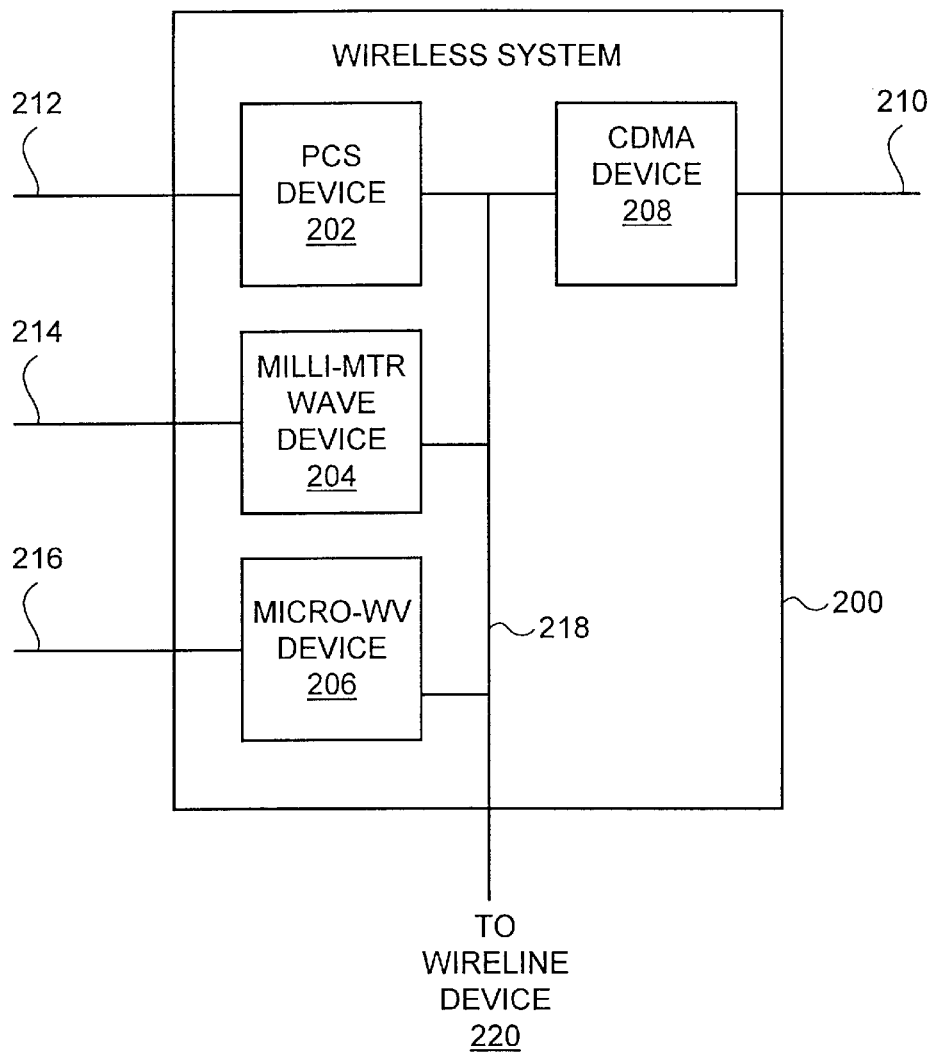
FIG. 2, illustrates a wireless system configuration in an example of the invention.

FIG. 2 illustrates an example of wireless systems 108 and 114, namely wireless system 200. Those skilled in the art will appreciate that numerous other configurations of wireless system 200 can be derived from the following example that are within the scope of the invention. Those skilled in the art will also appreciate how the principles illustrated in this example can be used in other examples of the invention.

Wireless system 200 comprises a PCS device 202, a CDMA device 208, a millimeter wave device 204, and a microwave device 206. PCS device 202, CDMA device 208, millimeter wave device 204, and microwave device 206 are connected to a wireline device 220 by an inter-node link 218. As with inter-node links 118, 120, and 104, inter-node link 218 could be a conventional link such as a physically tangible wireline or a wireless link.

PCS device 202 could be any device configured to exchange either the second or third inter-node signals with inter-node link 218 and exchange PCS wireless signals 212 over a wireless communication path. One example of PCS device 202 is a mobility PCS wireless device.

CDMA device 208 could be any device configured to exchange either the second or third inter-node signals with inter-node link 218 and exchange CDMA signals 210 over a wireless communication path. One example of CDMA device 208 is high data rate CDMA wireless device.

Millimeter wave device 204 could be any device configured to exchange either the second or third inter-node signals with inter-node link 218 and exchange millimeter wave signals 214 over a wireless communication path. One example of millimeter device 204 is a broadband millimeter wave wireless device.

Microwave device 206 could be any device configured to exchange either the second or third inter-node signals with inter-node link 218 and exchange microwave signals 216 over a wireless communication path. One example of microwave device 206 is a microwave multipoint distribution device.

Those skilled in the art will appreciate that wireless system 200 could also comprise any combination of wireless devices 202, 204, 206, and 208 as well as additional wireless devices not shown. For example, in one embodiment of the invention, wireless system 200 could comprise PCS device 202, CDMA device 208, and millimeter wave device 204. In another embodiment of the invention, wireless system 200 could comprise microwave device 206 and PCS device 202. Additional configurations include but are not limited to:

(1) PCS device 202, a global system for mobile communications, and a broadband microwave device for fixed and/or portable wireless ATM bundled communications of telephony voice, data, video multimedia, Internet and Intranet services;

(2) PCS device 202, a broadband microwave cable modem device, for fixed DOCSIS 1.1/1.2 packetized bundled communications of voice over Internet Protocol (VoIP), packetized telephony, multimedia, file transfer, Internet HTTP, and Intranet;

(3) PCS device 202, a broadband microwave ATM device, a broadband microwave cable modem device, and a free-space laser device for high speed communications of data streams at megabit, gigabit and terabit speeds using light frequencies; and (4) PCS device 202, and a wide band CDMA device for fixed, portable and mobile data services including Internet, Intranets, multimedia, VoIP, electronic commerce packetized voice and enhanced messaging and information services.

Each wireless device 202, 204, 206, and 208, within wireless system 200 is a layer, and each layer is a fully contained wireless system comprised of its own media access control, operational band, spectrum allocation, appropriate spectorization, and multiplex or spread spectrum technique. In addition, each layer includes individual base stations, antennas, and subscriber units. Services supported by each layer are delivered to the user through standard user devices. Some examples of user devices include but are not limited to video equipment, audio equipment and data equipment. Some examples of wireless services including telephony, data, video, messaging, fixed, portable and mobile provided to end user wireless subscriber units, handsets and portable appliances. A preferred feature of the invention, is that for purposes of packaging efficiency, installation ease, and aesthetics, wireless layers 202, 204, 206, and 208 may be combined in a common housing utilizing a common power supply.

In operation, homogeneous integration of wireless service functions from wireless layers 202, 204, 206, and 208, incorporated into wireless system 200, can be employed utilizing a derived service from one wireless layer e.g. 202 in coordination with another wireless layer e.g. 204. The integration does not require signaling or interpretation between wireless layers 202 and 204, but rather, the control of service invocation and signaling can be performed beyond wireless layers 202 and 204. Switches, and signaling systems at a customer site, in combination with the user devices control and invoke application of wireless layers 202, 204, 206, and 208.

An example is a video entertainment program invoked by a point and click program selection on the subscriber's computer screen. The upstream packets are carried via wireless Ethernet service to the service provider's nodal site and Intranet where the user selection is received at a content server. The server controls the content, which is sent to the subscriber and directs the subscriber's profile to a broadband wireless system layer e.g. 206 for transmission to the subscriber's television set.

Figure 3:
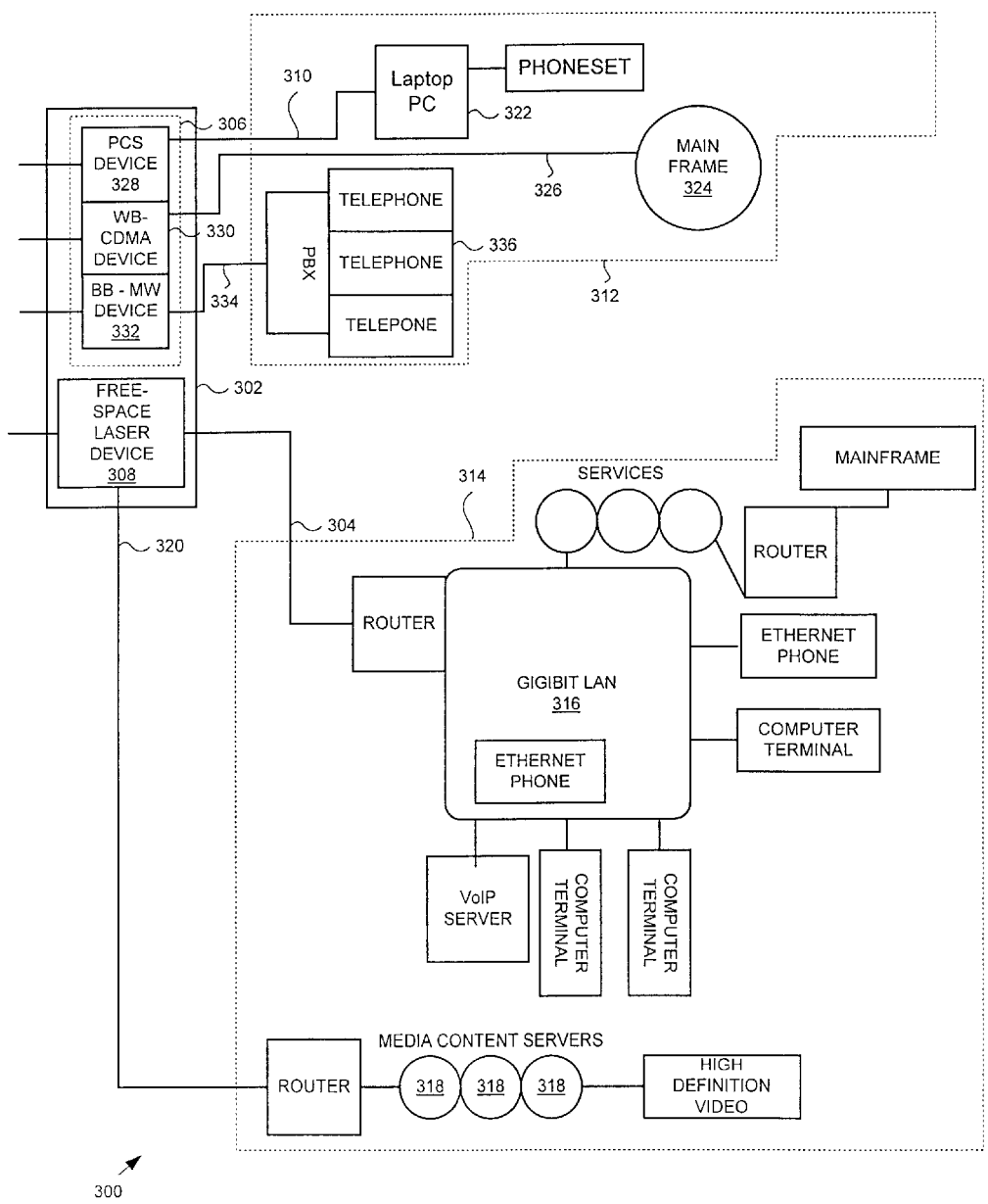
FIG. 3, illustrates a customer site in an example of the invention.

FIG. 3 illustrates a specific example of a customer site 300. Customer site 300 comprises customer node 302, mission critical user devices 312 and normal operation user devices 314. Customer node 302 comprises free-space laser device 308 and wireless system 306. Wireless system 306 comprises broadband microwave device 332, PCS device 328, and wide band CDMA device 330.

In operation, free-space laser device 308 exchanges free-space laser signals 304 with a Gigabit local area network (LAN) 316 and exchanges free-space laser signals 320 with media content servers 318. Wireless system 306 exchanges broadband wireless signals 334 with mission critical customer service center 336, exchanges wireless signals 326 with mission critical billing system main frame 324 and exchanges PCS wireless signals 310 with Laptop PC/Phoneset 322.

Free-space laser device 308 efficiently delivers up to gigabits of bandwidth for LAN based services. Some examples of free-space laser signals 304 and 320 include but are not limited to, Internet signals, LAN Intranet signals, server content hosting and VoIP, high quality video, and high-speed transfer of content or files. Wireless system 306 efficiently delivers up to gigabits of bandwidth using TCP/IP. One skilled in the art will appreciate that the performance trade off for free-space laser device 308 is less availability and greater susceptibility to errors in transmission. Wireless system 306 based on TCP/IP is more forgiving. TCP offers error control, providing end-to-end connectivity between data source and destination, with detection of and recovery from lost, duplicated, or corrupted packets.

Operationally, user traffic is configured to utilize the most appropriate one of free-space laser device 308 and wireless system 306 based on cost and criticality of the traffic. For example mission critical traffic from main frame billing system 324 and mission critical customer service center 336 is carried by wireless system 306, while normal operation traffic to LAN 316 and media content traffic to media content servers 318 is carried by free-space laser device 308. Some examples of mission critical traffic include but are not limited to, inbound calls to customer centers and reservation centers, operationally critical data service connections, and billing applications. Some examples of normal operation traffic include but are not limited to, media content traffic such as high definition video, Internet traffic, Gigabit LAN traffic, and VoIP traffic.

Figure 4:
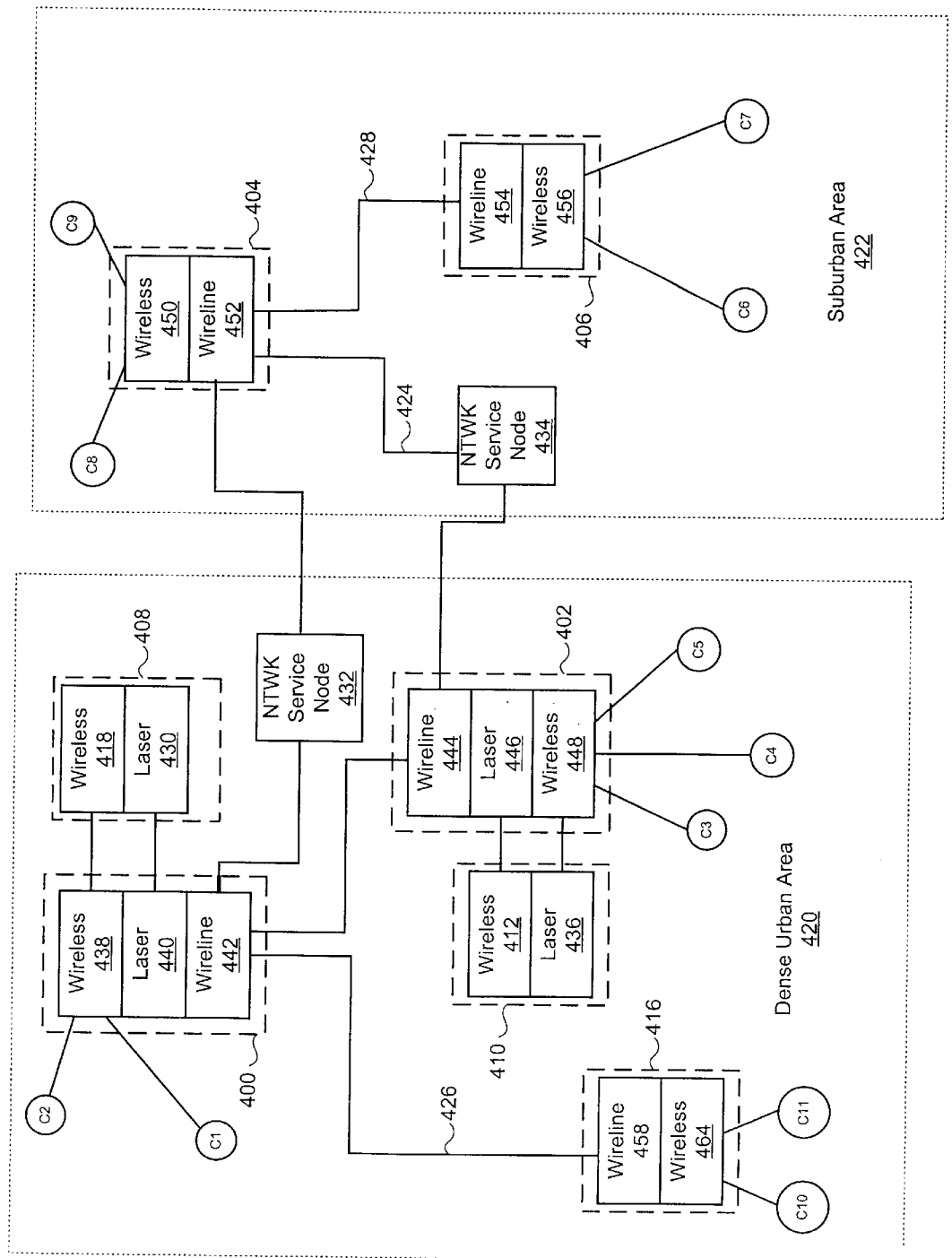
FIG. 4, illustrates a network configuration in an example of the invention.

FIG. 4 illustrates an example of a network configuration in one example of the invention. Those skilled in the art will appreciate that numerous other network configurations can be derived from the following example that are within the scope of the invention. Those skilled in the art will also appreciate how the principles illustrated in this example can be used in other examples of the invention.

FIG. 4 depicts a dense urban area 420 and suburban area 422. Dense urban area 420 comprises first communication nodes, 400 and 402, second communication node 416, network service node 432, customer sites, 408 and 410, and customer sites C1, C2, C3, C4, C5, C10, and C11. Suburban area 422 comprises second communication nodes, 404 and 406, network service node 434, and customer sites C6, C7, C8, and C9.

First communication node 400 comprises first wireless system 438, free-space laser device 440, and first wireline device 442. First communication node 402 comprises first wireless system 448, free-space laser device 446, and first wireline device 444. Second communication node 416 comprises second wireless system 464 and second wireline device 458.

First wireless systems, 438 and 448, could comprise any number of wireless devices, but preferably comprise a broadband wireless device either microwave or millimeter wave, a mobility PCS device, and a high data rate CDMA device. Second wireless system 464 could comprise any number of wireless devices, but preferably comprises a mobility PCS device and a high data rate CDMA device. These wireless systems best fit customer classifications, traffic demand, and range implications for the greatest efficiency of service provided for dense urban area 420.

Second communication node 404 comprises second wireless system 450, and second wireline device 452. Second communication node 406 comprises second wireless system 456, and second wireline device 454. Second wireless system 450 could comprise any number of wireless devices, but preferably comprises a mobility PCS device and a broadband fixed wireless device either microwave or millimeter wave. Second wireless system 456 could comprise any number of wireless devices, but preferably comprises a mobility PCS device and a high data rate CDMA device. These systems best fit customer classifications, traffic demand, and range implications for the greatest efficiency of service for suburban area 422.

Wireline 424 connects first communication nodes, 400 and 402, network service nodes, 432 and 434, and second communication node 404. Wireline 424 could be any wireline configured to carry wireline signals. Some examples of wireline 424 include but are not limited to fiber optic cabling carrying signals such as optical SONET signals, ATM signals, or Internet TCP/IP signals. In addition, wireline signals may be multiplexed signals. Some examples of multiplexing include but are not limited to, dense wavelength division multiplexing or time division multiplexing. In preferred embodiments, wireline 424 is a fiber optic DWDM line connecting communication nodes 400, 402 and 404 with service providing elements such as switches, routers, signaling systems, servers and enhanced messaging systems.

First communication node 400 is connected to second communication node 416 by wireline 426. Second communication node 404 is connected to second communication node 406 by wireline 428. Wirelines 426 and 428 could be any wirelines configured to carry wireline signals. Some examples of wirelines 426 and 428 are a DS1 fiber optic line and a DS3 fiber optic line.

First communication node 400 also connects to customer site 408 and customer sites C1 and C2. First communication node 402 connects to customer site 410, and customer sites C3, C4, and C5. Customer sites 408 and 410 are nodal customer sites comprising wireless systems, 412 and 418, and free-space laser devices 430 and 436. Customer sites C1, C2, C3, C4, C5, C6, C7, C8, C9, C10, and C11 could be fixed customer sites or mobile customer sites such as vehicular and/or pedestrian cellular phone customers.

Network service nodes 432 and 434 comprise network service enabling elements such as switches, Internet Protocol routers, content-information servers, enhanced messaging systems, signaling system control points and backbone transport for long distance networks. Network service nodes 432 and 434 provide a point of inter-connection with other networks and operators. For example, service node 432 could be a service inter-connection with a local exchange company or competitive local exchange companies providing service inter-connection with the Internet and private Intranets. Service node 434 could be an inter-connection with long distance domestic and international networks. Alternatively, one skilled in the art will appreciate that service enabling elements and systems maybe distributed throughout a deployment topology as well as centrally located in network service nodes 432 and 434.

Wireless services including telephony, data, video, messaging, fixed, portable and mobile provided to customer user wireless subscriber units, handsets and portable: appliances from nodes 400, 402, 406, 404 and 416. The wireless services are managed and enabled by service providing elements at the network service nodes 432 and 434. Services are transported between the network service nodes 432 and 434 and nodes 400, 402, 406, 404 and 416 over fiber optic wireline connections and dense wave division multiplex transmission such as wireline 424.

In operation, multiple wireless systems 438, 464, 448, 450, and 456 are integrated as parallel layers of a single monolithic wireless architecture with wireline devices 442, 458, 444, 452, and 454 providing backhaul terrestrial transport to network service nodes 432 and 434. Wireless systems 438, 464, 448, 450, and 456 each support a specific service category or traffic type by incorporating parallel layers of wireless systems e.g. wide band CDMA, broadband fixed wireless microwave or millimeter wave, and PCS wireless. For example, millimeter wave broadband fixed wireless systems and microwave broadband fixed wireless systems support high availability of voice telephony, and high-speed video conferencing. PCS wireless systems on the other hand provide universal mobile coverage, while wide band CDMA systems provide portable high-speed data transmission.

Demographically, suburban area 422 is spread out requiring service from longer ranged wireless systems, such as the microwave broadband fixed wireless device employed in wireless system 450. Dense urban area 420 on the other hand, can be serviced by shorter ranged wireless systems such as free-space laser devices, 440 and 446, or the millimeter wave broadband fixed wireless device in wireless system 438. As would be readily understood by one skilled in the art, the aggregate traffic from the demographically different communication nodes, e.g. 400 and 404, varies widely, thus requiring backhaul terrestrial transport to network service nodes 432 and 434 over wirelines 424, 426 and 428.

The multiple wireless systems 438, 464, 448, 450, and 456 support different range implications. For example a wide band CDMA portable data system and PCS systems generally support a range of one to three miles. Millimeter wave broadband fixed wireless systems generally support a range of one-half mile to one mile, and microwave broadband fixed wireless systems generally support a range of five to ten miles First communication nodes, 400 and 402, and second communication node 416 are designed to service both business and residential users in dense urban area 420. Second communication nodes, 404 and 406, are designed to service both business and residential users in suburban area 422. Some examples of users in suburban area 422 include but are not limited to, consumers, small office, home office, and small to medium sized business. Some examples of users in dense urban area 420 include but are not limited to, consumers, large and small office, and medium and large sized business. Alternatively, communication nodes 400, 402, 416, 404, and 406 may be used in either suburban area 422 or dense urban area 420 depending on customer demand.

It is apparent that there has been described, a communication system, that fully satisfies the objects, aims, and advantages set forth above. While the communication system has been described in conjunction with specific examples thereof, it is evident that many alternatives, modifications, and/or configurations can be devised by those skilled in the art in light of the foregoing description. Accordingly, this description is intended to embrace all such alternatives, modifications and variations as fall within the spirit and scope of the appended claims.

I claim:

1. A customer node within a customer site, comprising:

a free-space laser device configured for mounting on an elevated structure and configured to deliver a first gigabit of bandwidth to a first communication device within the customer site by exchanging free-space laser signals with the first communication system; and a wireless system configured to deliver a second gigabit of bandwidth to a second communication device within the customer site by exchanging wireless signals with the second communication system;

wherein the customer node transmits user traffic within the customer site using the free-space laser device or the wireless system depending on the type of the user traffic.

2. The customer node of claim 1 wherein the free-space laser device is configured to communicate with a communicate node outside of the customer site to exchange the user traffic.

3. The customer node of claim 1 wherein the wireless system is configured to communicate with a communicate node outside of the customer site to exchange the user traffic.

4. The customer node of claim 1 wherein the customer node transmits the user traffic using the free-space laser device or the wireless system based on the criticality of the user traffic.

5. The customer node of claim 1 wherein the customer node transmits the user traffic using the free-space laser device or the wireless system based on the cost of the user traffic.

6. The customer node of claim 1 wherein the wireless system comprises a broadband microwave device.

7. The customer node of claim 1 wherein the wireless system comprises a PCS device.

8. The customer node of claim 1 wherein the wireless system comprises a wideband CDMA device.

9. The customer node of claim 1 wherein the first communication system comprises a Local Area Network (LAN).

10. The customer node of claim 1 wherein the first communication system comprises a media content server.

11. The customer node of claim 1 wherein the second communication system comprises a Private Branch Exchange (PBX).

12. The customer node of claim 1 wherein the second communication system comprises a billing system main frame.

13. The customer node of claim 1 wherein the second communication system comprises a laptop computer phone set.

14. The customer node of claim 1 wherein the wireless system uses TCP/IP in providing the second gigabit of bandwidth.

15. A method of operating a customer node within a customer site, wherein the customer node comprises a free-space laser device and a wireless system, and wherein the free-space laser device is mounted on an elevated structure, the method comprising:

delivering a first gigabit of bandwidth to a first communication system within the customer site using the free-space laser device by exchanging free-space laser signals with the first communication system;

delivering a second gigabit of bandwidth to a second communication system within the customer site using the wireless system by exchanging wireless signals with the second communication system; and transmitting user traffic within the customer site using the free-space laser device or the wireless system depending on the type of the user traffic.

16. The method of claim 15 further comprising:

communicating with a communicate node outside of the customer site using the free-space laser device to exchange the user traffic.

17. The method of claim 15 further comprising:

communicating with a communicate node outside of the customer site using the wireless system to exchange the user traffic.

18. The method of claim 15 wherein transmitting user traffic within the customer site comprises:

transmitting the user traffic using the free-space laser device or the wireless system based on the criticality of the user traffic.

19. The method of claim 15 wherein transmitting user traffic within the customer site comprises:

transmitting the user traffic using the free-space laser device or the wireless system based on the cost of the user traffic.

20. The method of claim 15 wherein the wireless signals comprise broadband microwave signals.

21. The method of claim 15 wherein the wireless signals comprise PCS signals.

22. The method of claim 15 wherein the wireless signals comprise wideband CDMA signals.

23. The method of claim 15 wherein delivering a first gigabit of bandwidth to a first communication system comprises:

delivering the first gigabit of bandwidth to a Local Area Network (LAN).

24. The method of claim 15 wherein delivering a first gigabit of bandwidth to a first communication system comprises:

delivering the first gigabit of bandwidth to a media content server.

25. The method of claim 15 wherein delivering a second gigabit of bandwidth to a second communication system comprises:

delivering the second gigabit of bandwidth to a Private Branch Exchange (PBX).

26. The method of claim 15 wherein delivering a second gigabit of bandwidth to a second communication system comprises:

delivering the second gigabit of bandwidth to a billing system main frame.

27. The method of claim 15 wherein delivering a second gigabit of bandwidth to a second communication system comprises:

delivering the second gigabit of bandwidth to a laptop computer phone set.

28. The method of claim 15 wherein the wireless signals use TCP/IP in providing the second gigabit of bandwidth.

* * * * *